(12) United States Patent
Chen

(10) Patent No.: US 8,080,175 B2
(45) Date of Patent: Dec. 20, 2011

(54) SCINTILLATOR HAVING A MGAl₂O₄ HOST LATTICE

(75) Inventor: Ching-Fong Chen, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 462 days.

(21) Appl. No.: 12/319,523

(22) Filed: Jan. 8, 2009

(65) Prior Publication Data

US 2010/0171075 A1    Jul. 8, 2010

(51) Int. Cl.
*C09K 11/64*    (2006.01)
*C09K 11/55*    (2006.01)
(52) U.S. Cl. .................. 252/301.4 R; 501/153; 264/604
(58) Field of Classification Search ........... 252/301.4 R; 501/153; 264/604
See application file for complete search history.

(56) References Cited

OTHER PUBLICATIONS

Greskovich et al., "Ceramic Scintillators," Annual Review of Materials Science, vol. 27 (Aug. 1997) pp. 69-88.
van Loef et al., "High-energy-resolution Scintillator: Ce³⁺ activated LaBr₃," Applied Physics Letters, vol. 79 (Sep. 2001) pp. 1573-1575.
van Loef et al., "High-energy-resolution Scintillator: Ce3+ activated LaCl3," Applied Physics Letters, vol. 77 (Sep. 2000) pp. 1467-1468.
Moses, "Current Trends in Scintillator Detectors and Materials," Nuclear Instruments & Methods in Physics Research—A, vol. 487 (Jul. 2002) pp. 123-128.
Chen et al., "Nanosized Grain Polycrystalline Scintillators for Special Nuclear Materials Detection," SPIE Proceedings vol. 6707, (Sep. 2007) pp. 67070C-1-67070C-10.
Apetz et al. "Transparent Alumina: A Light-Scattering Model," Journal of the American Ceramic Society, vol. 86 (Mar. 2003) pp. 480-486.
Patterson et al., "Transparent Spinel Development," SPIE 45th International Symposium on Optical Science and Technology (Jul. 30-Aug. 4, 2000), San Diego, CA. (Proceedings of SPIE, vol. 4102 (Oct. 2000) pp. 59-68).
Harris, "History of Development of Polycrystalline Optical Spinel in the U.S.," Proceedings of SPIE, vol. 5786 (May 2005) pp. 1-22.
Mroz et al., "Recent Advances in Spinel Optical Ceramic," Proceedings of SPIE, vol. 5786 (May 2005) pp. 64-70.
Shimada et al., "Fabrication of Transparent Spinel Polycrystalline Materials," Materials Letters, vol. 28 (Oct. 1996) pp. 413-415.
Villalobos et al., "Degradation of Magnesium Aluminum Spinel by Lithium Fluoride Sintering Aid," Journal of the American Ceramic Society, vol. 88 (Apr. 2005) pp. 1321-1322.
Zhou et al., "Synthesis-Dependent Luminescence Properties of Y3Al5O12: Re3+ (Re=Ce, Sm, Tb) Phosphors," Materials Letters, vol. 56 (Nov. 2002) pp. 628-636.
Lin et al., "Luminescence and Energy Transfer of Rare-Earth-Metal Ions in Mg₂Y₈(SiO₄)₆O₂," Journal of Material Chemistry, vol. 5 (May 1995) pp. 1151-1154.

*Primary Examiner* — Carol M Koslow
(74) *Attorney, Agent, or Firm* — Samuel L. Borkowsky

(57) ABSTRACT

A scintillator having a host lattice of MgAl₂O₄ was prepared by hot pressing under a vacuum environment a powder mixture of MgAl₂O₄, CeO₂, and LiF.

10 Claims, 6 Drawing Sheets

SCINTILLATOR HAVING A MGAL$_2$O$_4$ HOST LATTICE

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to a scintillator having a host lattice of MgAl$_2$O$_4$.

BACKGROUND OF THE INVENTION

Gamma ray detectors are commonly used in nuclear and high-energy physics research, medical imaging, diffraction, nondestructive testing, nuclear treaty verification and safeguards, and geological exploration. Polycrystalline scintillators useful for gamma ray detectors typically have a high light output, high stopping efficiency, fast response, good proportionality, and minimal afterglow. More importantly, polycrystalline scintillators can be processed using conventional ceramic processing methods to achieve large sizes with low cost and high production rate.

SUMMARY OF THE INVENTION

In accordance with the purposes of the present invention, as embodied and broadly described herein, an aspect of the present invention relates to a transparent, dense scintillator of the formula M$_x$MgAl$_{2-x}$O$_4$, wherein $0.001 \leq x \leq 0.20$, and wherein M is selected from the following: Ce, La, Pr, Nd, Sm, Eu, Gd, Tb, Dy, Ho, Er, Tm, Lu, Tl.

The invention is also concerned with a transparent, dense scintillator having MgAl$_2$O$_4$ as a host lattice, prepared by sintering, under a vacuum, a powder mixture of from 80 to 99.999 mole percent MgAl$_2$O$_4$, at least 0.001 mole percent of a metal oxide, and a sintering agent, the metal oxide chosen from a metal oxide of La, Ce, Pr, Nd, Sm, Eu, Gd, Tb, Dy, Ho, Er, Tm, Lu, and Tl.

The invention also includes a process for producing a sintered, transparent, dense scintillator having a host lattice of MgAl$_2$O$_4$. The process involves molding a fine powder of at least 90% mole percent MgAl$_2$O$_4$, at least 0.001% mole percent metal oxide dopant, and at least 0.01% by weight of LiF, wherein the MgAl$_2$O$_4$ has an average particle diameter of not more than 5 microns, where the metal oxide is an oxide of a metal selected from Ce, La, Pr, Nd, Sm, Eu, Gd, Tb, Dy, Ho, Er, Tm, Lu, and Tl, and sintering the molded mixture at a temperature of 1200 to 2000° C.

The invention is also concerned with a power mixture of at least 80 mole percent MgAl$_2$O$_4$ having an average particle diameter of not more than 5 microns, at least 0.001 mole percent metal oxide dopant, and LiF, where the metal oxide is an oxide of a metal selected from Ce, La, Pr, Nd, Sm, Eu, Gd, Tb, Dy, Ho, Er, Tm, Lu, and Tl.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
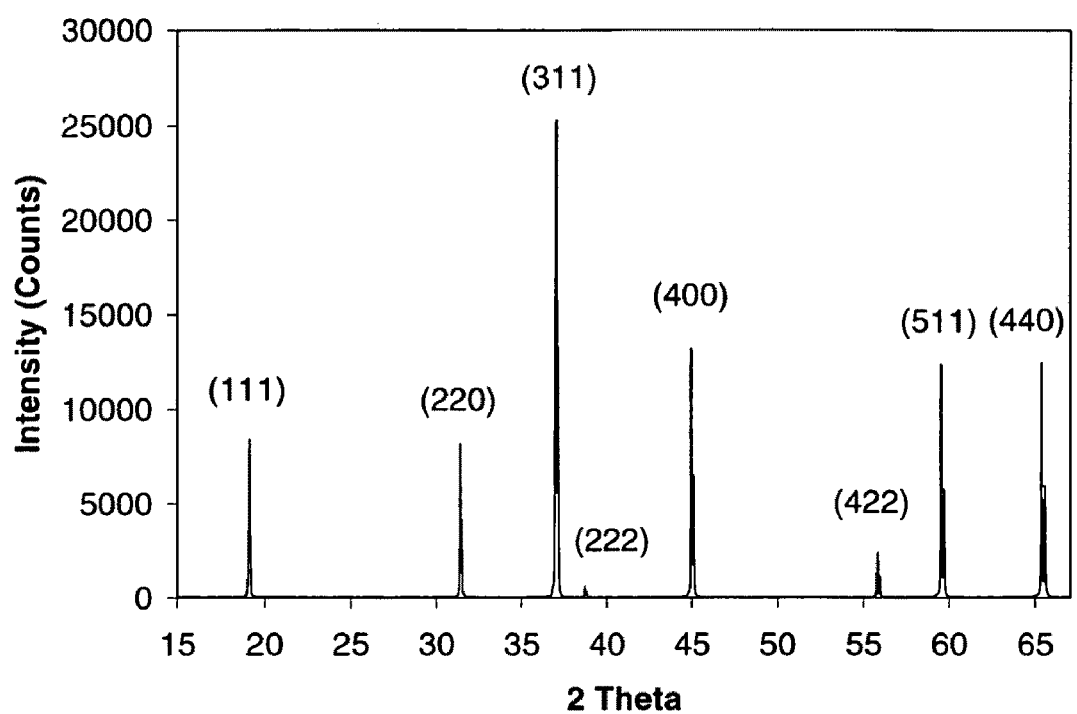
FIG. 1 shows an X-ray diffraction ("XRD") spectrum of an embodiment scintillator having as a host lattice MgAl$_2$O$_4$ and doped with cerium.

The invention is concerned with scintillators having MgAl$_2$O$_4$ as a host lattice. These scintillators are generally transparent, dense, single-phase, polycrystalline scintillators that can be used in gamma ray detectors, medical imaging, and other applications.

Polycrystalline magnesium aluminate ("MgAl$_2$O$_4$") is a spinel. It can transmit light from 200 nanometers to 5500 nanometers with no optical distortion. Its mechanical properties are comparable to polycrystalline aluminum oxide. It has a cubic structure and therefore exhibits no birefringence.

An embodiment scintillator may be prepared by sintering a molded powder mixture of MgAl$_2$O$_4$, a sintering agent, and a dopant metal oxide such as cerium oxide in an amount of from about 0.001 mole percent to about 20 mole percent.

Sintering may involve either hot-press sintering or pressureless sintering. Hot-press sintering is carried out by heating the molded powder mixture at a high temperature under a vacuum or in an air or inert atmosphere. In hot-press sintering, the strength of a pressure mold is a limit to the amount of pressure that can be used, so usually pressures of not more than 5000 psi are selected. Industrially, pressures of at least 1000 psi, preferably 3000 psi, are used. Pressureless sintering is carried out in an air or inert atmosphere (nitrogen, for example) without applying mechanical or pneumatic pressure to a molded article.

To make an embodiment scintillator, the powder mixture includes at least 80 mole percent of MgAl$_2$O$_4$, at least 0.01 mole percent of CeO$_2$, and a sintering agent (for example, lithium fluoride, ("LiF")). The sintering temperature is to from 1200° C. ("degrees Celsius") to 2000° C., preferably from 1500° C. to 1800° C. The sintering may be performed in air, vacuum, or under an inert atmosphere. The sintered product is a scintillator with a density of at least 3.0 g/cm$^3$.

An embodiment single-phase, dense, polycrystalline scintillator was prepared according to the procedure that follows. A powder mixture of MgAl$_2$O$_4$ powder with an average particle size of about 1 micron and purity higher than 99.9% by weight, CeO$_2$ powder with an average particle size of about 2 microns and purity higher than 99.9% by weight, and LiF powder with an average particle size of less than 50 microns and purity higher than 99% by weight. Raw material powders of MgAl$_2$O$_4$ and CeO$_2$ were weighed out for a sintered material having a composition Ce$_{0.005}$MgAl$_{1.995}$O$_4$. An amount of LiF was weighed out for 0.7% by weight of Ce$_{0.005}$MAl$_{1.995}$O$_4$. The weighed powders of MgAl$_2$O$_4$, CeO$_2$, and LiF were added to a 250 ml polyethylene bottle filled with ½" size high purity alumina grinding media and deionized water. The powder mixture was milled for about 1 hour at about 200 rpm. The resulting slurry was poured into a glass beaker and dried in an oven at about 85° C. overnight. The temperature was raised to 120° C., and the drying was continued at 120° C. for about 2 hours. The dried powder mixture was then cooled overnight. The cooled, dried powder was ground using a mortar and pestle, and then screened through a 100 mesh size sieve, loaded into a 30 mm diameter I.D. graphite die lined with grafoil, and hot pressed in a vacuum hot press (VACUUM INDUSTRY, Concord, Conn.). The heating rate was 600° C./hr from room temperature to 950° C. followed by a soak for ½ h at 950° C. The heating rate was 600° C./hr from 950° C. to 1450° C. followed by a soak for a ½ hr at 1450° C. The heating rate from 1450° C. to 1600° C. was 500° C./hr. The soak time at 1600° C. (peak temperature) was 2 hrs. A pressure schedule consisted of maintaining 200 psi from room temperature to the beginning of peak temperature i.e. 1600° C. The pressure was then increased to 4000 psi starting from the beginning of 1600° C. soak and held until the end of the 1600° C. hot pressing. Vacuum atmosphere was maintained from the beginning to the end of the hot pressing cycle. The purpose of the LiF is to serve as a sintering aid. When LiF is melted at about 850° C., the liquid phase LiF enhances the particle rearrangement of the $MgAl_2O_4$ and $CeO_2$ powders, which enhances the densification. The purpose of the 30 minutes soak at 950° C. was to allow the completion of the rearrangement process. This LiF liquid phase also enhances the diffusion of the $MgAl_2O_4$ and $CeO_2$ during sintering. The purpose of the vacuum was to evaporate LiF, especially at 1450° C. soak after it completes its role as a sintering aid. The resulting disc was 30 mm diameter by 2.5 mm thick. It was surface ground to a thickness of 2.0 mm using a 200 grid diamond wheel to achieve parallel surfaces that were polished using diamond paste in a sequence of 15, 9, 6, 3 and 1 micron. The phase was identified by x-ray diffraction and the density by the Archimedes method. Mirror-polished samples on both surfaces were used to measure optical transmittance from 200 to 3000 nm.

The FIGURES and their description that follows relate to the polished sample of single-phase, dense, polycrystalline scintillator produced according to the detailed procedure described above. FIG. 1 shows the room temperature, Bragg-Brentano XRD pattern of the polished sample. The observed XRD pattern of 7 peaks at a diffraction angle of 2-Theta between 15° to 70° is characteristic of the spinel phase. No other phases were detected. The pattern is an indication of a uniform distribution of Ce ions. The density of the polished sample was 3.579 g/cm$^3$, which is about 99.98% of the theoretical density, measured using the Archimedes method.

Figure 2A:
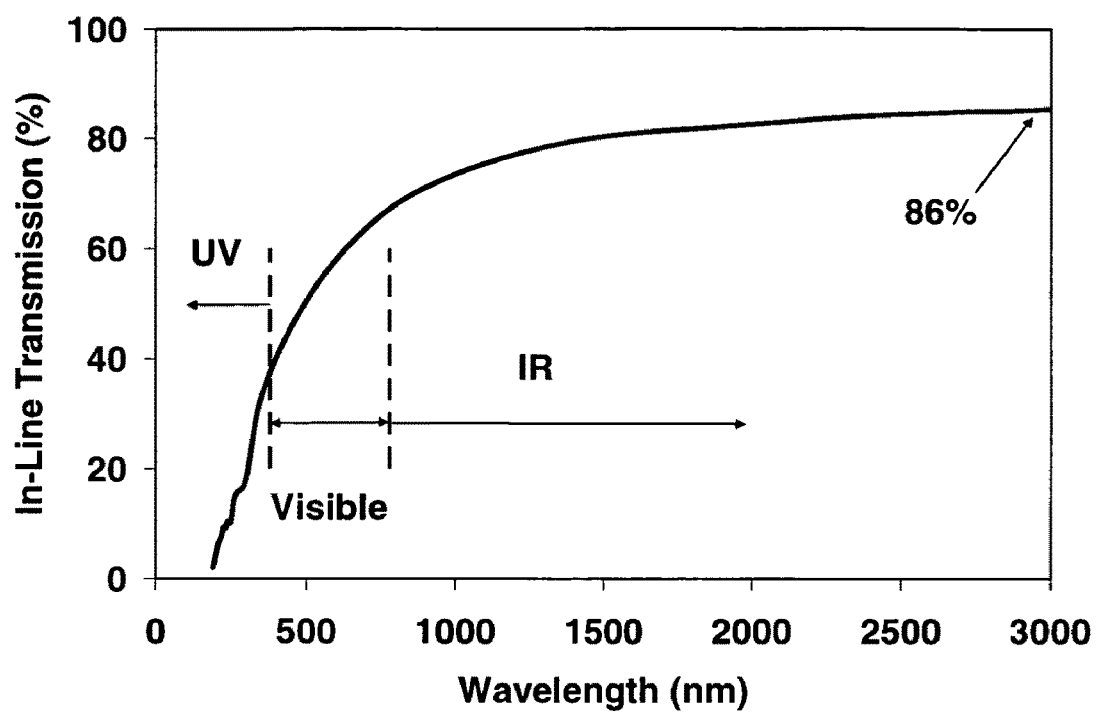
FIG. 2a and FIG. 2b show optical transmission spectra of the scintillator of FIG. 1.
Figure 2B:
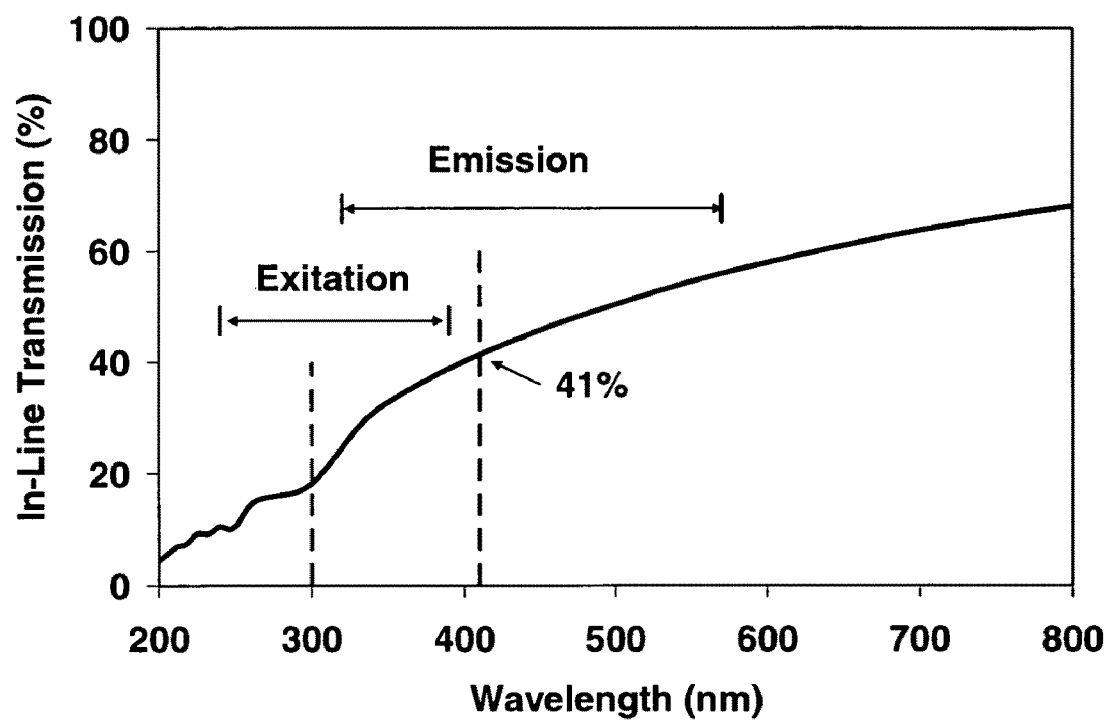

FIG. 2a shows an optical transmission spectrum from 200 to 3000 nanometers of the polished sample. The transmittance in the IR light region reaches about 86%. FIG. 2b shows the optical transmission ranging from 200 to 800 nm. The absorption band is centered at 300 nm. The polished sample thus has a UV light transmission of more than 30%, a visible light transmission of more than 40%, and IR transmission of more than 50%.

Figure 3:
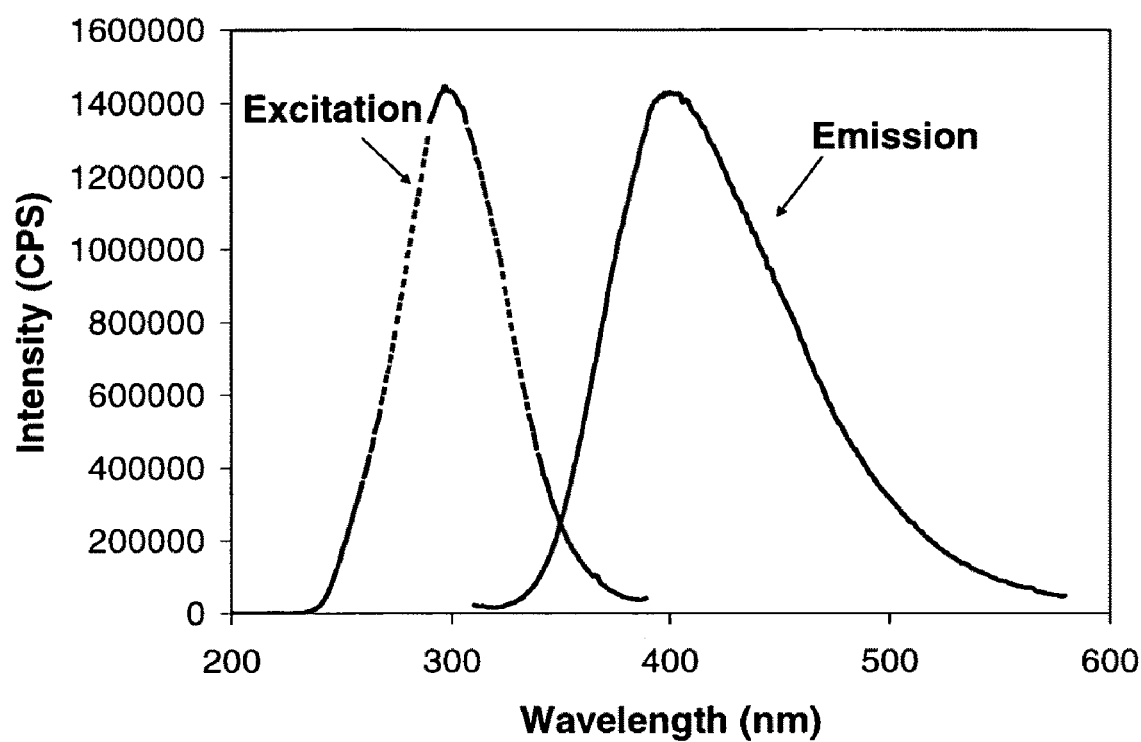
FIG. 3 shows an emission spectrum of the scintillator of FIG. 1 after X-ray excitation.

FIG. 3 shows an emission spectrum of the scintillator after X-ray excitation using a broad band from 240 to 390 nm with a peak at 300 nm. The emission spectrum consists of a broad band from 320 to 570 nm with a characteristic peak structure at 410 nm.

Figure 4A:
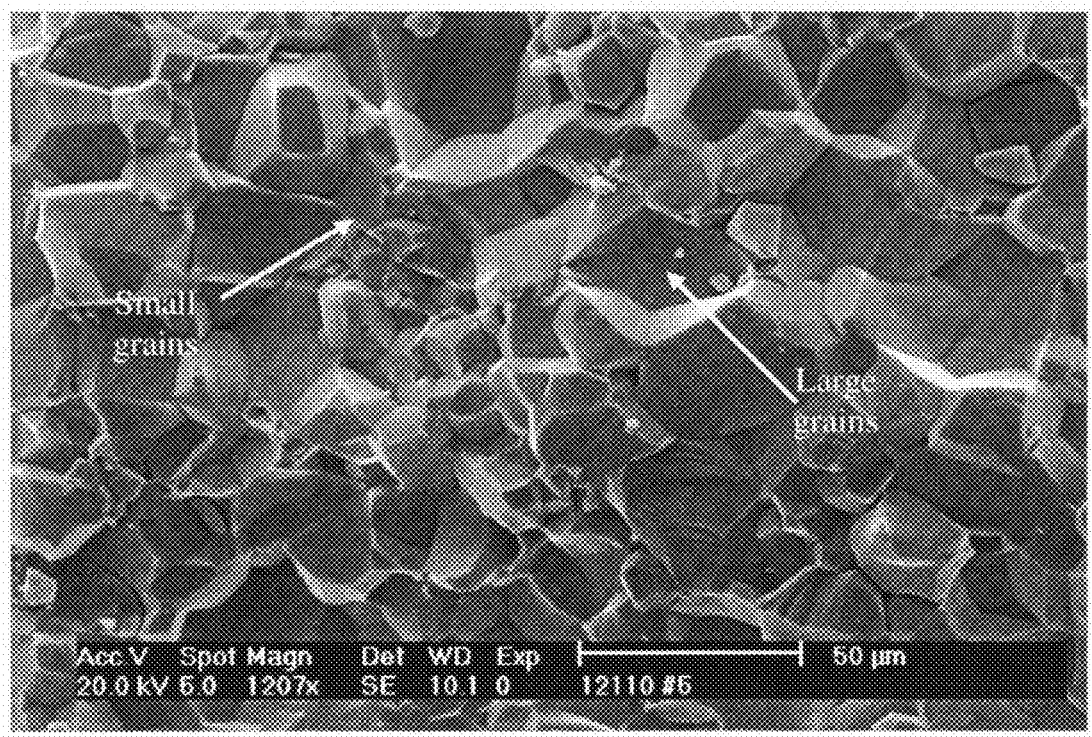
FIG. 4a and FIG. 4b show micrographs of the scintillator of FIG. 1.

FIG. 4a is a scanning electron micrograph ("SEM") showing the microstructure of the polished sample. The grain sizes from this SEM micrograph are in a range of from about 3 to 50 micrometers with an average grain size estimated at about 20 micrometers.

Figure 4B:
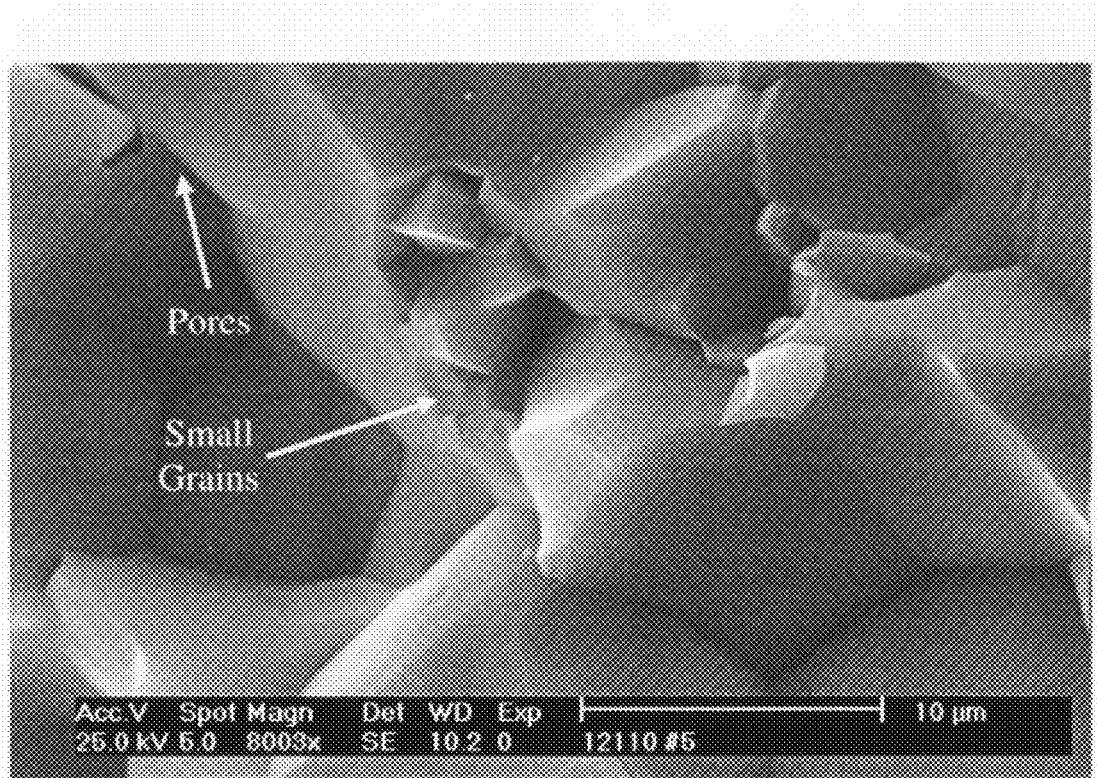

FIG. 4b is a higher magnification SEM micrograph of the polished sample showing some residual pores within the polycrystalline structure. Most of the residual pores are on the order of 1 to 2 microns. These microstructural inhomogeneities and a small amount of residual pores confirm its slightly less than fully transparent transmissivity. FIGS. 4a and 4b show that the embodiment scintillator has a mechanically fractured surface and is formed of closely packed fine crystal grains distinct from each other by clear contours that are polygonal, and at least 70% of the crystal grains have a particle diameter in a range of 1 to 100 microns.

A transparent sintered body of $MgAl_2O_4$ was prepared exactly as described above with the exception that $CeO_2$ was left out of the powder mixture. This transparent sintered body did not produce an emission spectrum when excited by X-rays.

A sintered body was also produced when the above procedure was to repeated exactly as described above but with the exception that LiF was left out of the powder mixture. The resulting sintered hot-pressed disk product was opaque and did not have optical transmission properties.

Scintillators of this invention are prepared by sintering a powder mixture having $MgAl_2O_4$, a sintering agent, and a component metal oxide that incorporates itself into the lattice of the $MgAl_2O_4$, resulting in a scintillator. A scintillator of the present invention can be processed by conventional ceramic forming methods to achieve a large size with a low cost and high production rate. The invention has been demonstrated using cerium oxide as the component metal oxide, and it should be understood that other embodiment scintillators of the invention may be produced when the an oxide of a metal from the following list is used instead of cerium oxide: La, Pr, Nd, Sm, Eu, Gd, Tb, Dy, Ho, Er, Tm, Tb, Lu, or Tl. Thus, the general formula of a scintillator of this invention is $M_xMgAl_{2-x}O_4$, wherein $0.001 \leq x \leq 0.20$, and wherein M is selected from Ce, La, Pr, Nd, Sm, Eu, Gd, Tb, Dy, Ho, Er, Tm, Lu, or Tl.

It should also be understood that another aspect of this invention is concerned with a powder mixture used to form the scintillator. The powder mixture, thus is one of at least 80 mole percent of $MgAl_2O_4$ having an average particle diameter of not more than 5 microns, at least 0.001 mole percent metal oxide dopant, and LiF, where the metal oxide is an oxide of a metal selected from Ce, La, Pr, Nd, Sm, Eu, Gd, Tb, Dy, Ho, Er, Tm, Lu, and Tl. A powder mixture used to prepare an embodiment scintillator as described and shown above includes cerium oxide.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. Although the invention has been disclosed with reference to its preferred embodiments, from reading this description those of skill in the art can appreciate changes and modifications that may be made which do not depart from the scope and spirit of the invention as described above and claimed hereafter. It is intended that the scope of the invention be defined by the claims appended hereto.

What is claimed is:

1. A transparent, dense scintillator of the formula $M_xMgAl_{2-x}O_4$, wherein $0.001 \leq x \leq 0.20$, and wherein M is selected from Ce, La, Pr, Nd, Sm, Eu, Gd, Tb, Dy, Ho, Er, Tm, Lu, or Tl.

2. The scintillator of claim 1, wherein M is Ce.

3. A transparent, dense scintillator having $MgAl_2O_4$ as a host lattice, prepared by sintering under a vacuum a powder mixture of from 80 to 99.999 mole percent $MgAl_2O_4$, at least 0.001 mole percent of a metal oxide, and a sintering agent, the metal oxide chosen from a metal oxide of La, Ce, Pr, Nd, Sm, Eu, Gd, Tb, Dy, Ho, Er, Tm, Lu, or Tl.

4. The scintillator of claim 3, wherein the metal oxide is cerium oxide.

5. The scintillator of claim 4, wherein the sintering agent is lithium fluoride.

6. The scintillator of claim 4, wherein the scintillator has a light transmittance of more than 50% in the IR range, more than 40% in visible range, and more than 30% in UV range.

7. The scintillator of claim 4, said scintillator comprises a mechanically fractured surface and is formed of closely packed fine crystal grains distinct from each other by clear contours that are polygonal, wherein at least 70% of said crystal grains have a particle diameter in a range of 1 to 100 microns, and wherein said scintillator is further characterized by
   (i) an X-ray diffraction pattern that consists essentially of seven diffraction lines assigned to cubic $MgAl_2O_4$ crystals at a diffraction angle of 2 theta between 15° to 70°, and
   (ii) an emission spectrum produced by X-ray excitation, said spectrum including a broad band from 320 to 570 nm with a peak structure at 410 nm.

8. A process for producing a sintered, transparent, dense scintillator having a host lattice of $MgAl_2O_4$ comprising:
   molding a fine powder of at least 80 mole percent $MgAl_2O_4$, at least 0.001 mole percent metal oxide dopant, and LiF, wherein the $MgAl_2O_4$ has an average particle diameter of not more than 5 microns, where metal oxide is an oxide of a metal selected from La, Ce, Pr, Nd, Sm, Eu, Gd, Tb, Dy, Ho, Er, Tm, Lu, and Tl, and
   sintering the molded mixture at a temperature of 1200° C. to 2000° C.

9. A powder mixture of at least 80 mole percent of $MgAl_2O_4$ having an average particle diameter of not more than 5 microns, at least 0.001 mole percent metal oxide dopant, and LiF, where the metal oxide is an oxide of a metal selected from Ce, La, Pr, Nd, Sm, Eu, Gd, Tb, Dy, Ho, Er, Tm, Lu, and Tl.

10. The powder mixture of claim 9, wherein the metal oxide is cerium oxide.

* * * * *